United States Patent [19]

Minami et al.

[11] Patent Number: 4,461,507
[45] Date of Patent: Jul. 24, 1984

[54] EDGE GARNISH MOLDING ASSEMBLY
[75] Inventors: Chojiro Minami, Yokohama; Yukiharu Masui, Zama, both of Japan
[73] Assignee: Nissan Motor Co., Ltd., Yokohama, Japan
[21] Appl. No.: 401,909
[22] Filed: Jul. 26, 1982
[30] Foreign Application Priority Data
  Aug. 5, 1981 [JP] Japan .................. 56-123381
[51] Int. Cl.³ ................................ B62D 25/00
[52] U.S. Cl. ................................ 296/76; 52/209
[58] Field of Search ........... 296/76, 37.16; 49/476, 49/490, 498; 52/208, 716–718
[56] References Cited
U.S. PATENT DOCUMENTS

| 2,733,096 | 1/1956 | Waterhouse et al. | 296/76 |
| 2,793,070 | 5/1957 | Wernig | 296/76 |
| 3,110,065 | 11/1963 | Dennis | 296/76 |
| 3,167,825 | 2/1965 | Zoller | 20/69 |
| 3,927,493 | 1/1974 | Tsuneishi | 49/476 |
| 4,343,504 | 8/1982 | Tomioka | 296/76 |

FOREIGN PATENT DOCUMENTS

| 2009239 | 9/1971 | Fed. Rep. of Germany . |
| 2122690 | 11/1972 | Fed. Rep. of Germany . |
| 2400927 | 8/1974 | Fed. Rep. of Germany ........ 296/76 |
| 2213404 | 8/1974 | France . |

Primary Examiner—Robert R. Song
Attorney, Agent, or Firm—Lane, Aitken & Kananen

[57] ABSTRACT

An edge garnish molding assembly of this invention is provided with a drain insert member which is interposed between a garnish portion of an edge garnish molding and a flanged edge defining an opening in a vehicle for receiving a movable door, thus to form a drain opening for establishing communication between the outside of a vehicle body and a chamber which is formed in the garnish portion and extends along the top of the flanged edge.

12 Claims, 5 Drawing Figures

EDGE GARNISH MOLDING ASSEMBLY

BACKGROUND OF THE INVENTION

1. Field of the Invention

The present invention relates in general to an edge garnish molding assembly for a door or the like movable closure receiving opening in an automotive vehicle and more particularly to the kind wherein an edge garnish molding is integrally formed with a weatherstrip for sealing between the movable closure and the vehicle body.

2. Description of the Prior Art

FIG. 2 shows a prior art edge garnish molding assembly 10 which is adapted for use with a rear door 12 (see FIG. 1) of an automotive vehicle. As illustrated, the assembly 10 broadly comprises a vehicle body structure 14 having an upwardly flanged edge 15 defining at the upper end thereof a rear door receiving opening 16 (see FIG. 1), and an edge garnish molding 18 which is installed on the upwardly flanged edge 15 and generally called a rear door weatherstrip. The upwardly flanged edge 15 of the vehicle body structure 14 is partly formed from a rear end outer panel 22 including an upright flange portion 22a and a shoulder portion 22b arranged at the bottom of the flange portion 22a and in predetermined angular relationship therewith, and a rear end inner panel 20 including an upright flange portion 20a spot-welded to the flange portion 22a of the rear end outer panel 22. The edge garnish molding 18 includes a synthetic resinous, resilient garnish portion 24 fitted on the flange portions 20a and 22a of the rear end inner and outer panels 20 and 22 for safety as well as for aesthetic purposes. The garnish portion 24 is of an inverted U-shaped section and includes a pair of legs 24a and 24b which are arranged on the respective sides of the flange portions 20a and 22a, i.e., arranged inside 26 and outside 28 of the vehicle body, respectively. The garnish portion 24 also has a plurality of resilient fingers 24c protruding inwardly from the inside walls of the legs 24a and 24b. When the edge garnish molding 18 is installed, the fingers 24c firmly hold therebetween the flange portions 20a and 22a to retain the garnish portion 24 and therefore the edge garnish molding 18 in place on the flange portions 20a and 22a. The edge garnish molding 18 also includes a first weatherstrip portion 30 for providing a seal between the rear door 12 and the garnish portion 24, and a second weatherstrip portion 32 for providing a seal between the garnish portion 24 and the vehicle body structure 14. The first and second weatherstrip portions 30 and 32 are made of rubber and integrally formed with the garnish portion 24 by the common extrusion. The first weatherstrip 30 is hollow and protrudes upwardly from the juncture between the legs 24a and 24b, while the second weatherstrip 32 protrudes outwardly and slightly downwardly from the lower end of the outside leg of the garnish portion 24 to terminate at an end where it resiliently engages the rear end outer panel shoulder portion 22b forming a predetermined angle with the flange portion 22a.

The prior art edge garnish molding assembly of the type described above has the disadvantage that it cannot provide an assured and complete seal between the movable closure and the vehicle body structure, that is, the assembly has the possibility of allowing ingress of water such as rain or car washing water, following the path indicated by the arrows in the drawing, into the luggage compartment closed by the rear door 12 or into the space between the rear end inner and outer panels 20 and 22 to wet or rust them.

It is revealed by the experiments conducted by the applicants that such ingress of water results from the fact that upon the spot welding, flange portions 20a and 22a are formed with detents or depressions which tend to cause gaps between the fingers 24c and the flange portions 20a and 22a, and also from the fact that the garnish portion 24 is in part installed in inclined relationship with the flange portions 20a and 22a, tending to cause gaps between the second weatherstrip portion 32 and the rear end outer panel 22. Water thus has access through the above described gaps to a chamber 34 which is formed within the garnish portion 24 to receive therein the upper ends of the flange portions 20a and 22a and then collected at the lowest part of the chamber 34 to flow over the flange portions 20a and 22a.

In order to prevent such ingress of water, it is known, as shown in FIG. 3, to fill the chamber 34 throughout the length thereof with butyl rubber 36 and install the edge garnish molding 18 in such a manner that the upper ends of the flange portions 20a and 22a are forced into the layer of butyl rubber 36. This, however, results in an increased manufacturing and assemblying cost due to the need for the flange portions 20a and 22a to be forced into the layer of butyl rubber resulting in difficult assembly work as well as the need of costly filling of butyl rubber 36.

SUMMARY OF THE INVENTION

In accordance with the present invention, there is provided an edge garnish molding assembly which comprises a vehicle body structure having an upwardly flanged edge defining an opening receiving a movable closure, an edge garnish molding mounted on the flanged edge and having a chamber extending along the top of the flanged edge, and at least one insert member interposed between the edge garnish molding and the flanged edge at the lowest part thereof above the ground to define a drain opening establishing communication between the chamber and the outside of the vehicle body.

This structure enables the assembly to overcome the disadvantages noted above, that is, assuredly prevent ingress of water to the interior of a vehicle compartment or to the gaps formed between spot-welded panels.

It is accordingly an object of the present invention to provide an edge garnish molding assembly for an automotive vehicle which is able to overcome the disadvantages noted above.

It is another object of the present invention to provide an edge garnish molding assembly of the above described character which can assuredly prevent ingress of water to the interior of a vehicle compartment or to the gap formed between spot-welded panels without substantially increasing the manufacturing and assembling cost.

BRIEF DESCRIPTION OF THE DRAWINGS

The features and advantages of the edge garnish molding assembly according to the present invention will become more clearly appreciated from the following description taken in conjunction with the accompanying drawings, in which.

DESCRIPTION OF THE PREFERRED EMBODIMENT

Figure 1:
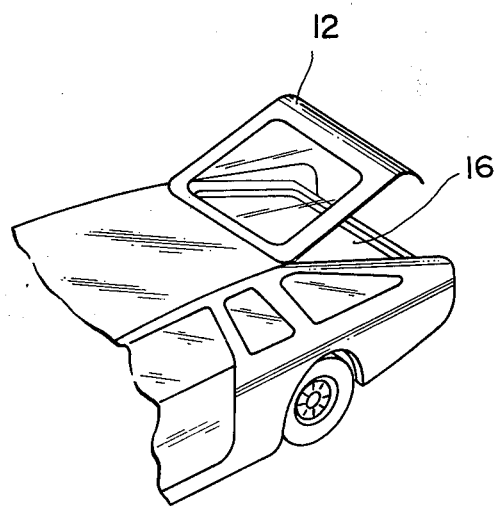
FIG. 1 is a perspective view of a rear part of an automotive vehicle with which the present invention can be used.
Figure 2:
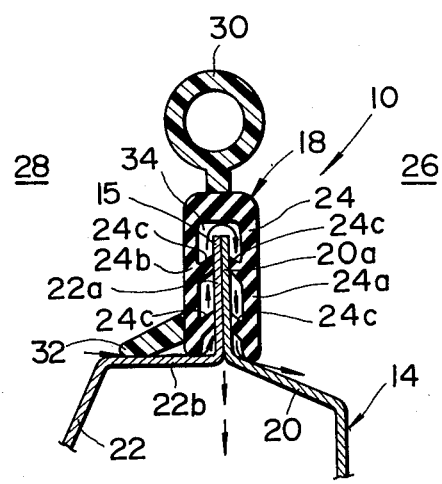
FIGS. 2 and 3 are sectional views and show prior art edge garnish molding assemblies, respectively.
Figure 3:
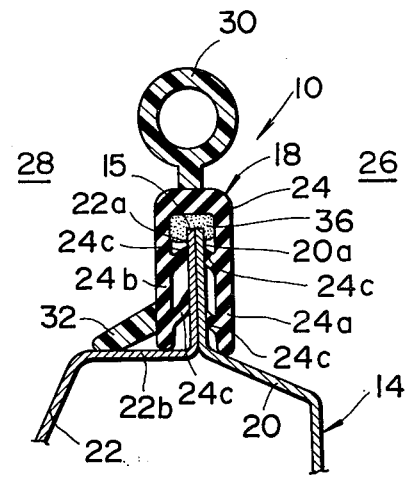
Figure 4:
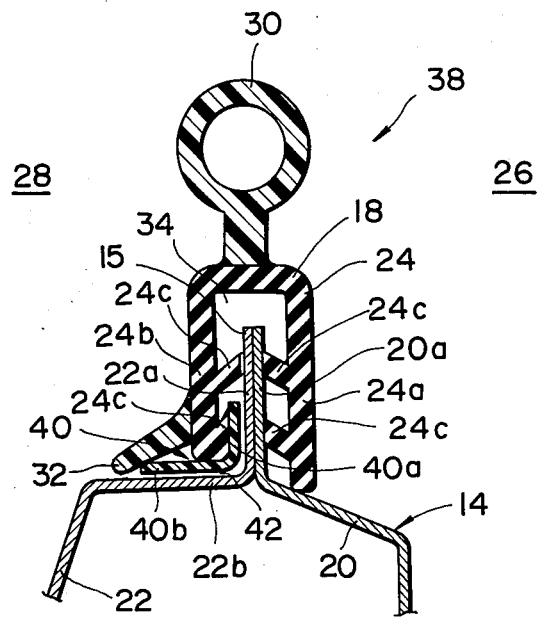
FIG. 4 is a sectional view showing an edge garnish molding assembly according to the present invention.
Figure 5:
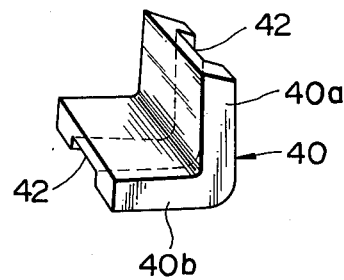
FIG. 5 is a perspective view of a drain insert member utilized in the edge garnish molding assembly of FIG. 4.

Referring to FIGS. 4 and 5, an edge garnish molding assembly according to the present invention is generally indicated at 38 and shown mounted on a vehicle body structure. The assembly is substantially identical to those of the prior art assembly of FIGS. 2 and 3 and carry identical reference characters.

In accordance with the present invention, the assembly 38 is provided with a synthetic resinous drain insert member 40 which is interposed between the edge garnish molding 18 and the flanged edge 15 at the lowest part thereof above the ground to form a drain opening which establishes communication between the outside of the vehicle body and the inside of the edge garnish molding 18, i.e., the chamber 34 extending along the top of the flanged edge 15. More specifically, the drain insert member 40 has an L-shaped section including an upright first leg 40a and a substantially horizontal second leg 40b and shaped to conform to the angled figure formed by the flange portion 22a and shoulder portion 22b of the rear end outer panel 22. The first leg 40a of the drain insert member 40 is shorter than the flange portion 22a and placed between the flange portion 22a and the outside leg 24b of the garnish portion 24, while the second leg 40b is placed between the shoulder portion 22b and the lower end of the outside leg 24b and also between the shoulder portion 22b and the second weatherstrip portion 32. Once installed, the drain insert member 40 is retained in place by the resiliency of the edge garnish molding 18. That is, the outside leg 24b is in part placed on the drain insert member 40 urging same against the rear end outer panel 22 and brought directly into contact at the remaining part with the rear end outer panel 22. Similarly, the second weatherstrip portion 32 is in part placed on the drain insert member 40 urging same against the rear end outer panel 22 and brought directly into contact at the remaining part with the rear end outer panel 22. The drain insert member 40 also has, in the side surface thereof contacting the flange and shoulder portions 22a and 22b, a groove 42 which cooperates with the flange and shoulder portions 22a and 22b to define the foregoing drain opening by which water, should it be collected in the chamber 34 for the reason described hereinbefore, would be drained and thereby prevented from flowing over the flange portions 20a and 22a.

In this embodiment, though only one drain insert member 40 is illustrated, there are in fact two drain insert members 40 which are arranged by the side of the horizontal flange portions 20a and 22a since the lowest part of the vehicle body structure 14 defining the rear door receiving opening 16 runs along the flange portions 20a and 22a of the rear end inner and outer panels 20 and 22.

In installation, the drain insert member 40 is first installed at its first leg 40a into the garnish portion 24 at a predetermined place or places. The edge garnish molding 18 is then fitted together with the drain insert member 40 on the flange portions 20a and 22a of the rear end inner and outer panels 20 and 22. The installation of the edge garnish molding 18 is therefore not much more difficult and time-consuming than that of the comparable prior art molding such as the one shown in FIG. 2.

From the foregoing, it will be understood that since water having had access to the chamber 34 is collected at the lowest part of the chamber 34, at least one drain insert member 40 will suffice, when arranged at a suitable place, to cope with the problem inherent in the prior art edge garnish molding assembly of the described type. However, when the lowest part of the chamber 34 is of considerable length, two or more drain insert members 40 may be arranged along that lowest part at equal spacing.

Further, it will be understood that while the present invention has been described and shown as applied to an edge garnish molding assembly for a rear door receiving opening, it may similarly be applied to another edge garnish molding assembly for a trunk lid receiving opening, rear side window receiving opening, side door receiving opening or the like. That is, the edge garnish molding may be so-called trunk lid weatherstrip, side door weatherstrip, rear side window weatherstrip or the like.

Obviously, many variations and modifications of the present invention are possible in light of the above teachings. It is, therefore, to be understood that within the scope of the appended claims, the invention may be practiced otherwise than as specifically described.

What is claimed is:

1. An edge garnish molding assembly comprising:
    a vehicle body structure having an upwardly flanged edge defining an opening receiving a movable closure;
    an edge garnish molding mounted on said flanged edge and having a chamber extending along the top of said flanged edge; and
    at least one drain insert member interposed between said edge garnish molding and said flange edge at the lowest part thereof to define a drain opening establishing communication between said chamber and the outside of the vehicle body.

2. An edge garnish molding assembly as set forth in claim 1, in which said flanged edge has an upright flange portion and a shoulder portion at the bottom of said flange portion, and in which said edge garnish molding has a garnish portion of an inverted U-shaped section including a pair of legs on the respective sides of said flange portion facing the inside and outside of the vehicle body and a plurality of fingers protruding inwardly from the inside walls of said legs to hold therebetween said flange portion for thereby retaining said edge garnish molding on said flanged edge, said chamber being formed in said garnish portion and receiving therein the upper end of said flange portion.

3. An edge garnish molding assembly as set forth in claim 2, in which said drain insert member has an L-shaped section and is shaped to conform to the angled figure formed by said flange portion and said shoulder portion.

4. An edge garnish molding assembly as set forth in claim 3, in which said drain insert member has a first leg interposed between said flange portion and one of said legs of said garnish portion on the outside of the vehicle body, and a second leg interposed between said shoulder portion and said outside one leg of said garnish portion, and in which said first leg of said drain member is shorter than said flange portion.

5. An edge garnish molding assembly as set forth in claim 4, in which said drain insert member has, in the side surface thereof contacting said flange portion and said shoulder portion, a groove which cooperates with said flange portion and said shoulder portion to define said drain opening.

6. An edge garnish molding assembly as set forth in claim 1, in which said edge garnish molding also has a first weatherstrip portion for providing a seal between said movable closure and said garnish portion, and a second weatherstrip portion for providing a seal between said garnish portion and said vehicle body structure.

7. An edge garnish molding assembly as set forth in claim 6, in which said garnish portion is made of plastics, and said first and second weatherstrip portions are made of rubber.

8. An edge garnish molding assembly as set forth in claim 6, in which said second leg of said drain insert member is also interposed between said shoulder portion and said second weatherstrip portion.

9. An edge garnish molding assembly comprising:
a vehicle body structure having an upwardly flanged edge defining an opening for receiving a movable closure;
an edge garnish molding mounted on said flanged edge and defining therewith a chamber between the flanged edge and the molding extending along at least a top portion of said flanged edge;
means for draining fluid accumulations from a fluid collecting location in said chamber to the outside of the vehicle body, said draining means including at least one drain insert member disposed between a portion of said flanged edge and an adjacent portion of said garnish molding at said fluid collecting location, said drain member defining with said garnish molding and said flanged edge a drain opening communication between said chamber and the outside of said vehicle.

10. The assembly as set forth in claim 9 wherein said drain insert member has an L-shaped section including an upright first leg located between an upright portion of said flanged edge and an outside portion of said garnish molding, and a second leg located between a portion of said vehicle body and said outside portion of said garnish molding, said first leg and said second leg together defining a groove which cooperates with the upright portion of said flanged edge, the outside portion of said garnish molding, and said portion of said vehicle body to define a continuous drain opening between said chamber and the outside of said vehicle.

11. An edge garnish molding assembly comprising:
a vehicle body having an upwardly flanged edge, comprising an upright flange portion and a shoulder portion at the bottom of said flange portion and defining an opening receiving a movable closure;
an edge garnish molding mounted on said flanged edge and having a chamber extending along the top of said flanged edge; and
at least one drain insert member interposed between said garnish molding and said flanged edge at a low portion thereof to define a drain opening establishing communication between said chamber and the outside of the vehicle body, said drain insert member having an L-shaped section and shaped to conform to the angled figure formed by said flange portion and said shoulder portion of said flanged edge, said drain insert member including a first leg interposed between said flange portion and said garnish molding, and a second leg interposed between said shoulder portion and an outside portion of said garnish molding, said first leg being shorter than said flange portion.

12. An edge garnish molding assembly as set forth in claim 11, in which said drain insert member has, in the side surface thereof contacting said flange portion and said shoulder portion, a groove which cooperates with said flange portion and said shoulder portion to define said drain opening.

* * * * *